April 22, 1947.        R. C. TOLLEFSON        2,419,300
PRODUCTION OF 1,3-BUTYLENE GLYCOL
Filed Aug. 10, 1944
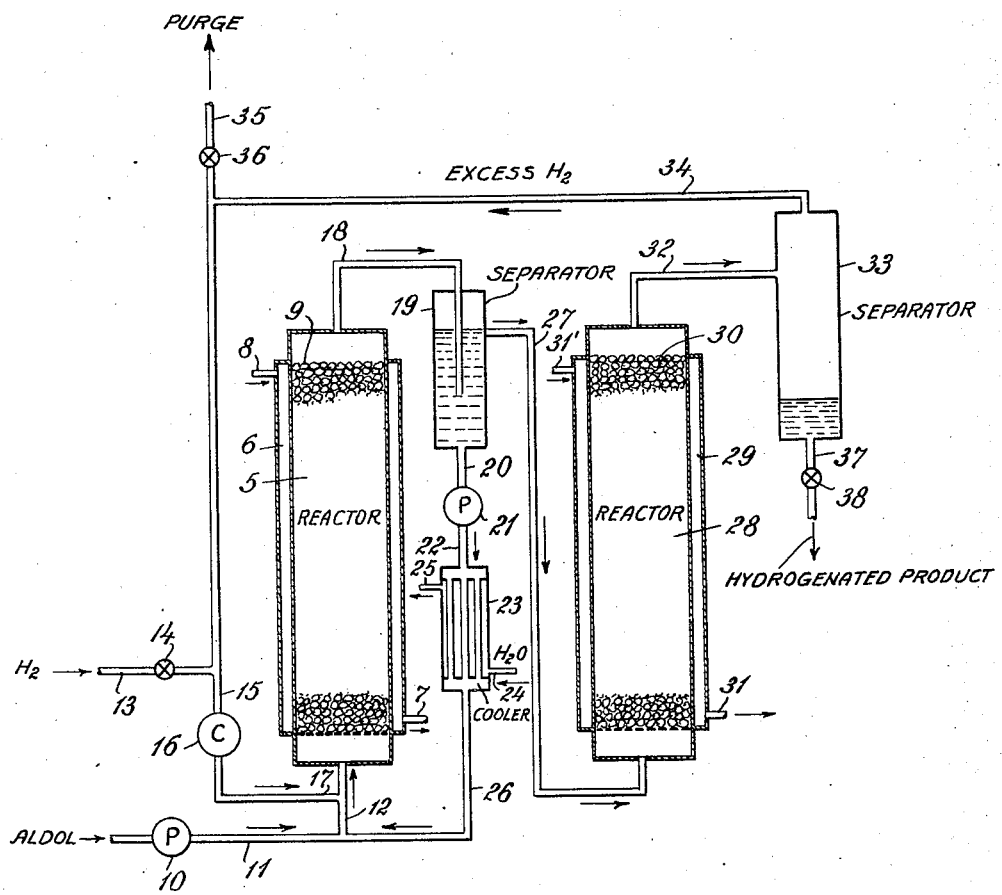
INVENTOR
Richard C. Tollefson
BY
Pennie Davis Marvin & Edmonds
ATTORNEYS Patented Apr. 22, 1947

2,419,300

UNITED STATES PATENT OFFICE 2,419,300

PRODUCTION OF 1,3-BUTYLENE GLYCOL

Richard C. Tollefson, Stamford, Conn., assignor to Air Reduction Company, Incorporated Application August 10, 1944, Serial No. 548,842

2 Claims. (Cl. 260—635)

This invention relates to the production of 1,3-butylene glycol, and particularly to the hydrogenation of acetaldol (commonly called aldol).

The hydrogenation of aldol has been suggested heretofore. The reaction theoretically should result in the production of 1,3-butylene glycol. However, this reaction is not easily accomplished with full theoretic yields, and is especially subject to the presence of impurities in the product, notably butanol. Frequently a substantial part of the aldol supplied to the reaction is converted to butanol with resulting substantial loss of the desired product.

It is the object of the present invention to provide a simple and economically efficient procedure to effect the conversion of aldol to 1,3-butylene glycol by catalytic reduction with hydrogen.

Another object of the invention is the provision of a method which can be conducted without substantial production of butanol, crotonaldehyde and similar undesirable impurities.

Other objects and advantages of the invention will be apparent as it is better understood by reference to the following specification and the accompanying drawing, diagrammatically illustrating an apparatus suitable for the practice of the invention.

The reduction of aldol to 1,3-butylene glycol occurs according to the following reaction:

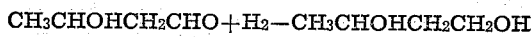

$CH_3CHOHCH_2CHO + H_2 \rightarrow CH_3CHOHCH_2CH_2OH$

The reduction requires the presence of hydrogen and an hydrogenation catalyst in intimate contact with the aldol at elevated pressure. In order that the operation may be conducted continuously, I provide for the continuous flow of the aldol in contact with the catalyst and the withdrawal of the hydrogenated product.

I have discovered that the reaction may be effected in an improved manner by conducting it in two steps. In the presence of a suitable hydrogenation catalyst the reaction commences at a temperature as low as 35° C. but is relatively slow. In the initial step, the temperature of the reaction should not be permitted to rise substantially above a maximum of 75° C. and at such temperature, a conversion of from 75-85% of the aldol may be accomplished without producing any substantial proportion of butanol. The reaction product may be then subjected to the second step by contact with a suitable hydrogenation catalyst in the presence of hydrogen at a higher temperature not substantially exceeding 115° C., whereby the reaction is completed with substantially 100% of the aldol. The higher temperature in the second step is possible without the formation of butanol because the material supplied to the second step is already substantially converted. Hence the final product is substantially free from butanol, crotonaldehyde and similar impurities.

Any suitable hydrogenation catalyst may be employed, but I have found that a most efficient catalyst is lump nickel prepared from a nickel-aluminum alloy and containing some aluminum, usually a proportion substantially equal to the amount of nickel. Such a catalyst may be prepared by crushing an alloy of nickel and aluminum containing about 58% aluminum (a variety of the well-known Raney nickel alloy) and subjecting it to a 16% aqueous solution of sodium hydroxide in the ratio of 0.75 gallon of solution per pound of alloy. The liquid should completely cover the alloy while the reaction is in progress for a period of fifteen minutes. The solution is then removed and the alloy is washed for eight hours with a spray of water of sufficient volume so that the alloy is continually immersed in water. The thoroughly washed alloy is then transferred to the catalyst chamber, care being taken that air does not come into contact with the alloy during transfer. Upon analysis, the material so treated is usually found to contain approximately 51% of nickel and 49% of aluminum.

While the foregoing method produces a catalyst which is especially satisfactory for the practice of the invention, it is not necessary to use a catalyst prepared precisely in the manner described. Nickel-aluminum alloys of differing compositions may be employed. Moreover, active hydrogenation catalysts of other composition may also be utilized, the invention being more particularly in the procedure as herein described wherein the aldol is subjected to successive hydrogenation steps under controlled temperature conditions.

This procedure will be better understood by reference to the drawing in which 5 is a reactor of any suitable material. Preferably a material of a non-corrosive nature, such as chrome steel, is employed, although the reaction may be made of iron. It is provided with a jacket 6 through which hot water or steam may be circulated by means of pipes 7 and 8 in order to raise the mass of catalyst 9 initially to the desired temperature. The catalyst 9 is in lump form, that is, in the form of fairly large pieces (4-8 mesh) which substantially fill the reactor. The latter is constructed of sufficient strength to withstand the pressure maintained, for example, 450 pounds per square inch. The pressure is not critical, and higher or lower pressures may be employed, although I have found the pressure stated to be most satisfactory in the operation of the procedure. Aldol is introduced by a pump 10 through a pipe 11 and branch pipe 12. Hydrogen is delivered by a pipe 13 controlled by a valve 14 to a pipe 15 and is forced by a compressor 16 through a pipe 17 to the branch 12 and thus enters the reactor with the aldol.

The reaction product is delivered through a pipe 18 to a chamber 19. A portion of the product is withdrawn from the chamber 19 through a pipe 20 and is delivered by a pump 21 and pipe 22 to a cooler 23 through which water is circulated by means of pipes 24 and 25. By regulating the pump 21 and the amount of cooling water flowing through the cooler 23, the temperature of the product can be controlled. The product is returned through a pipe 26 to the branch 12 and thence to the reactor 5 where it mingles with the fresh aldol introduced through the pipe 11. Thus the temperature within the reactor can be controlled so that it does not exceed a maximum of approximately 75° C., thereby avoiding the undesirable reactions which will occur if the temperature reaches a higher range.

A portion of the reaction product is withdrawn through a pipe 27 and delivered to a second reactor 28 having a jacket 29 through which steam may be circulated by means of pipes 30 and 31. The reactor 28 is filled with the catalyst 30 similar in form and composition to the catalyst 9 in the reactor 5. Hydrogen passes over with the reaction product through the pipe 27 and continues upwardly through the reactor 28 so that hydrogenation proceeds while the temperature is raised to not exceeding 115° C. by passage of steam at atmospheric pressure through the jacket 29.

The product escapes through a pipe 32 to a separator 33. The unused hydrogen returns through a pipe 34 to the pipe 15 for further use. Any desired portion thereof may be discharged through a purge 35 controlled by a valve 36.

The hydrogenated product consisting substantially of 1,3-butylene glycol is withdrawn through a pipe 37 controlled by valve 38. This product, as indicated, is free from undesirable reaction products and constitutes substantially 100% conversion of the aldol which is introduced through the reactor 5.

The aldol fed to the reaction may be diluted with ethyl alcohol or water, if desired. A mixture of approximately equal parts of water and aldol has been found very satisfactory.

As an example of the invention, the reactors 5 and 28 are filled with pieces of the nickel-aluminum alloy hereinbefore described, the pieces being of approximately 4-8 mesh. Larger or smaller pieces may be employed, the purpose being to secure the maximum effective surface contact between the catalyst and the reacting materials. A feed of 50% aqueous solution of aldol is introduced to the initial reactor together with hydrogen at a pressure of 450 pounds per square inch. The feed rate of the aldol solution is regulated in accordance with the reaction so that the two reactors are filled and that the product withdrawn is 1,3-butylene glycol. The temperature in the first reactor is maintained by means of circulation and cooling in the manner hereinbefore described so that the reaction product leaving the reactor is at a temperature of approximately 72° C. The uncirculated portion of the reaction product from the first reactor is subjected to hydrogenation in the second reactor at a temperature so that the product leaving the second reactor is at a temperature of approximately 103° C. When operating in the manner described, the percentage of hydrogenation of aldol in the first reactor is 84-85%. The percentage of hydrogenation of aldol in the second reactor is 100% with substantially no formation of butanol.

The catalyst as described possesses a remarkably long life. It is a rugged as well as an active catalyst. The procedure permits the continuous hydrogenation of aldol to 1,3-butylene glycol over very long periods of time with a high degree of efficiency.

Various changes may be made in the details of the procedure and in the catalyst employed without departing from the invention or sacrificing the advantages thereof.

I claim:

1. The method of converting aldol to 1,3-butylene glycol which comprises subjecting aldol to a hydrogenation catalyst in lump form in the presence of hydrogen at elevated pressure and at a temperature not substantially exceeding 75° C. until approximately 75% to 85% of the aldol has been hydrogenated to 1,3-butylene glycol, withdrawing the resulting product, cooling a portion of the product, returning the withdrawn cooled portion to the catalyst, subjecting the remainder of the withdrawn product in a separate reaction chamber to further reaction in the presence of a hydrogenation catalyst and hydrogen at elevated pressure and at a higher temperature not materially exceeding 115° C.

2. The method of converting aldol to 1,3-butylene glycol which comprises subjecting aldol to a nickel-aluminum catalyst in lump form in the presence of hydrogen at elevated pressure and at a temperature not substantially exceeding 75° C. until approximately 75% to 85% of the aldol has been hydrogenated to 1,3-butylene glycol, withdrawing the resulting product, cooling a portion of the withdrawn product, returning the cooled portion to the catalyst, subjecting the remainder of the withdrawn product in a separate reaction chamber to further reaction in the presence of a nickel-aluminum catalyst and hydrogen at elevated pressure and at a higher temperature not materially exceeding 115° C.

RICHARD C. TOLLEFSON.

REFERENCES CITED

The following references are of record in the file of this patent:

UNITED STATES PATENTS

| Number | Name | Date |
|---|---|---|
| 2,318,823 | Mueller-Cunradi | May 4, 1943 |

FOREIGN PATENTS

| Number | Country | Date |
|---|---|---|
| 348,248 | British | May 14, 1931 |

OTHER REFERENCES

Berkman et al., "Catalysis," pp. 259-260; 1940.